United States Patent
Ectors

(10) Patent No.: US 10,179,550 B1
(45) Date of Patent: Jan. 15, 2019

(54) FLUSH-MOUNT SENSOR LENS ASSEMBLY

(71) Applicant: GM GLOBAL TECHNOLOGY OPERATIONS LLC, Detroit, MI (US)

(72) Inventor: Bregt Ectors, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/897,294

(22) Filed: Feb. 15, 2018

(51) Int. Cl.
- *G03B 17/00* (2006.01)
- *B60R 11/04* (2006.01)
- *G03B 17/56* (2006.01)
- *B60R 11/00* (2006.01)

(52) U.S. Cl.
CPC ............ *B60R 11/04* (2013.01); *G03B 17/561* (2013.01); *B60R 2011/0019* (2013.01); *B60R 2011/0045* (2013.01)

(58) Field of Classification Search
USPC .......................................................... 396/419
See application file for complete search history.

(56) References Cited

U.S. PATENT DOCUMENTS

| | | | | |
|---|---|---|---|---|
| 8,041,209 B2 * | 10/2011 | Watanabe | .................. | B60R 1/12 396/429 |
| 8,922,655 B2 * | 12/2014 | Forgue | .................... | B60R 19/52 224/309 |
| 9,150,165 B1 * | 10/2015 | Fortin | ..................... | B60R 11/04 |
| 9,446,721 B2 * | 9/2016 | Jagoda | ..................... | B60R 11/04 |
| 9,860,430 B1 * | 1/2018 | Penza | ................... | H04N 5/2252 |
| 2014/0158731 A1 * | 6/2014 | Squire | ..................... | B60R 11/04 224/545 |
| 2015/0195435 A1 * | 7/2015 | Oshida | .................... | B60R 11/04 348/373 |

\* cited by examiner

*Primary Examiner* — Rodney E Fuller

(57) ABSTRACT

An automotive vehicle includes a plurality of panels defining a vehicle body. The plurality of panels include a first panel and a second panel. The second panel has an aperture therethrough. The vehicle additionally includes a camera housing and a camera having a lens. The camera is disposed at least partially within the camera housing. The vehicle further includes a mounting feature coupling the housing to the first panel, with the camera lens disposed in register with the aperture.

12 Claims, 2 Drawing Sheets

FLUSH-MOUNT SENSOR LENS ASSEMBLY

TECHNICAL FIELD

The present disclosure relates to automotive vehicles, and more particularly to sensor assemblies for automotive vehicles.

INTRODUCTION

Automotive vehicles may be provided with one or more sensors having lenses. Aft-mounted optical cameras have become commonplace to provide additional driver awareness when backing up, and additional optical cameras may be provided in other locations on automotive vehicles. Moreover, in vehicles having automated driving systems, additional sensor types having lenses, such as LiDAR, may be provided.

SUMMARY

An automotive vehicle according to the present disclosure includes a plurality of panels defining a vehicle body. The plurality of panels includes a first panel and a second panel. The second panel has an aperture therethrough. The vehicle additionally includes a camera housing and a camera having a lens. The camera is disposed at least partially within the camera housing. The vehicle further includes a mounting feature coupling the housing to the first panel, with the camera lens disposed in register with the aperture.

In an exemplary embodiment, the mounting feature comprises a bracket coupled to the housing and to the first panel. In such embodiments, the bracket may have an annular portion and at least one arm member projecting from the annular portion, with the camera housing being secured to the annular portion, and the at least one arm member being secured to the first panel.

In an exemplary embodiment, the first panel is provided with a second aperture, and the mounting feature is disposed at least partially within the second aperture.

In an exemplary embodiment, the vehicle additionally includes a seal member disposed between the mounting feature and the second panel.

In an exemplary embodiment, the second panel defines an exterior panel at an aft portion of the vehicle.

An assembly according to the present disclosure includes a first panel and a second panel. The first panel has a first panel first surface, a first panel second surface, and a first aperture extending therethrough. The second panel is disposed proximate the first panel. The second panel has a second panel first surface, a second panel second surface, and a second aperture extending therethrough. The second panel first surface is adjacent the first panel second surface. The assembly additionally includes a sensor module. The sensor module has a sensor housing and a sensor with a lens. The sensor is disposed at least partially within the sensor housing. The assembly additionally includes a mounting feature coupling the sensor module to the second panel. The sensor module is disposed at least partially in the second aperture with the lens generally in register with the first aperture.

In an exemplary embodiment, the mounting feature comprises a bracket coupled to the sensor housing and to the first panel. In such embodiments, the bracket may have an annular portion and at least one arm member projecting from the annular portion, with the camera housing being secured to the annular portion and the at least one arm member being secured to the second panel. In such embodiments, the annular portion may have an outer periphery with a flange member projecting from the outer periphery, with the flange member abutting the first panel second surface. Such embodiments may additionally include a seal member disposed between the mounting feature and the first panel second surface, with the seal member being retained by the flange member.

In an exemplary embodiment, the mounting feature is coupled to the second panel second surface.

In an exemplary embodiment, the sensor comprises an optical camera.

In an exemplary embodiment, the first panel defines an exterior panel of an automotive vehicle.

Embodiments according to the present disclosure provide a number of advantages. For example, embodiments according to the present disclosure provide low-profile sensor assemblies which may result in more aesthetically-desirable styling.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Figure 1:
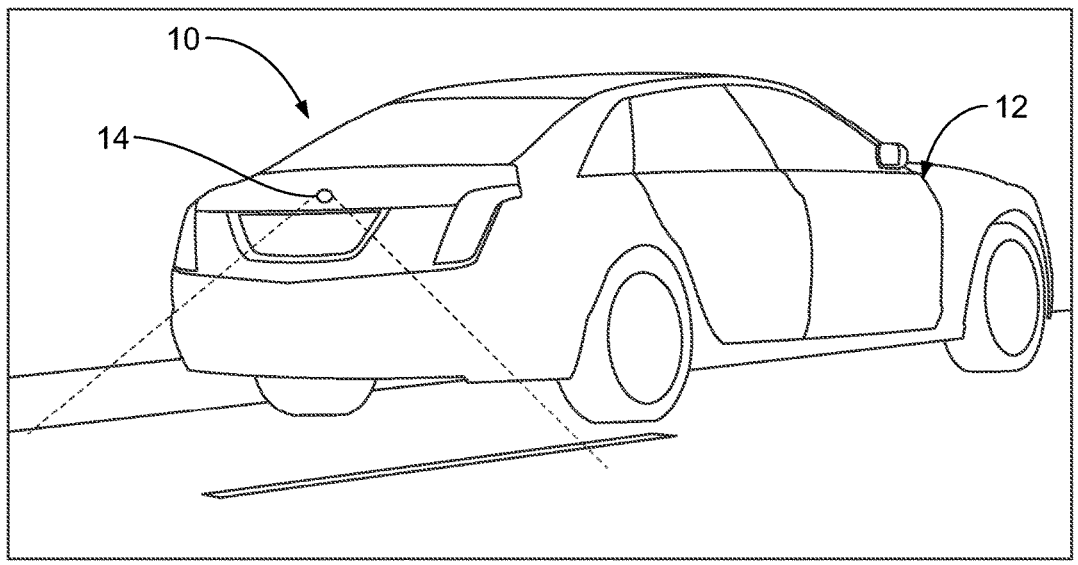
FIG. 1 is an illustrative view of an automotive vehicle according to an embodiment of the present disclosure.

Referring now to FIG. 1, an automotive vehicle 10 according to an embodiment of the present disclosure is illustrated. The automotive vehicle 10 has a body 12 which may enclose a passenger compartment. Generally, one or more occupants can be disposed in the passenger compartment. The passenger compartment may be provided with one or more doors that open and close to allow the occupants to enter and exit the vehicle 10. The body 12 includes a fore portion and an aft portion, with a plurality of fascia pieces or panels, some or all of which are visible from the outside of the passenger compartment of the vehicle 10. Generally, the fascia pieces or panels surround the vehicle 10. The fascia pieces or panels may include a front fascia surrounding a grille, and may also include a rear panel which can include a rear fascia, and side panel(s) which can include front quarter panel fascia(s) and rear quarter panel fascia(s). Generally, the front fascia is disposed along the fore portion of the vehicle, and the rear fascia is disposed along the aft portion of the vehicle 10. The front quarter panel fascia(s) can be disposed adjacent to the front fascia and the rear quarter panel fascia(s) can be disposed adjacent to the rear fascia.

A sensor assembly 14 is disposed on the body 12. In the embodiment illustrated in FIG. 1 the sensor assembly 14 is disposed on the aft portion of the body 12, positioned to sense a region proximate the aft portion of the body 12. However, other embodiments within the scope of the present disclosure include sensor assemblies disposed on other locations of the body, including any of the fascia pieces or panels, an interior panel in the passenger compartment, or any combination thereof.

Known sensor assemblies for automotive vehicles are provided in relatively bulky housing assemblies coupled to the exterior of the vehicle. Such assemblies may have undesirable impacts on desired vehicle styling.

Figure 3:
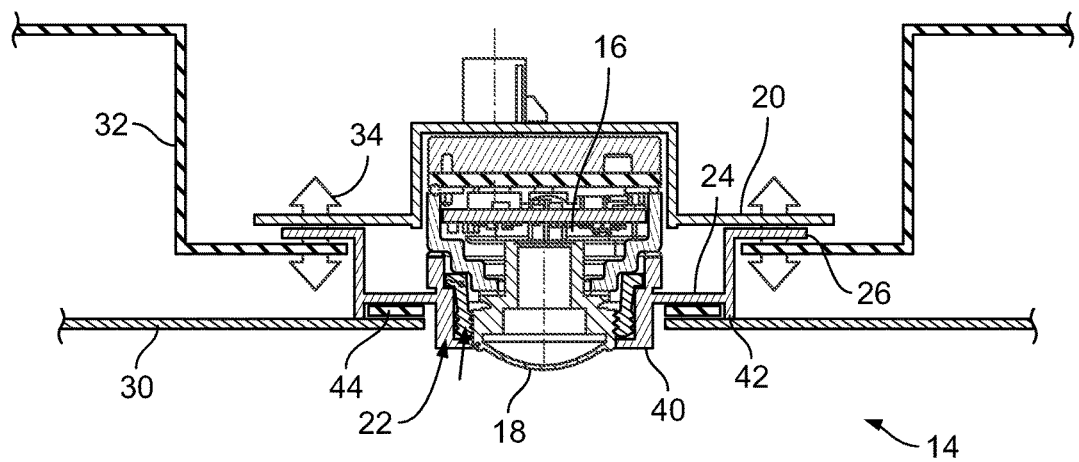
FIG. 3 is a cross-sectional view of an assembly according to an embodiment of the present disclosure.
Figure 2:
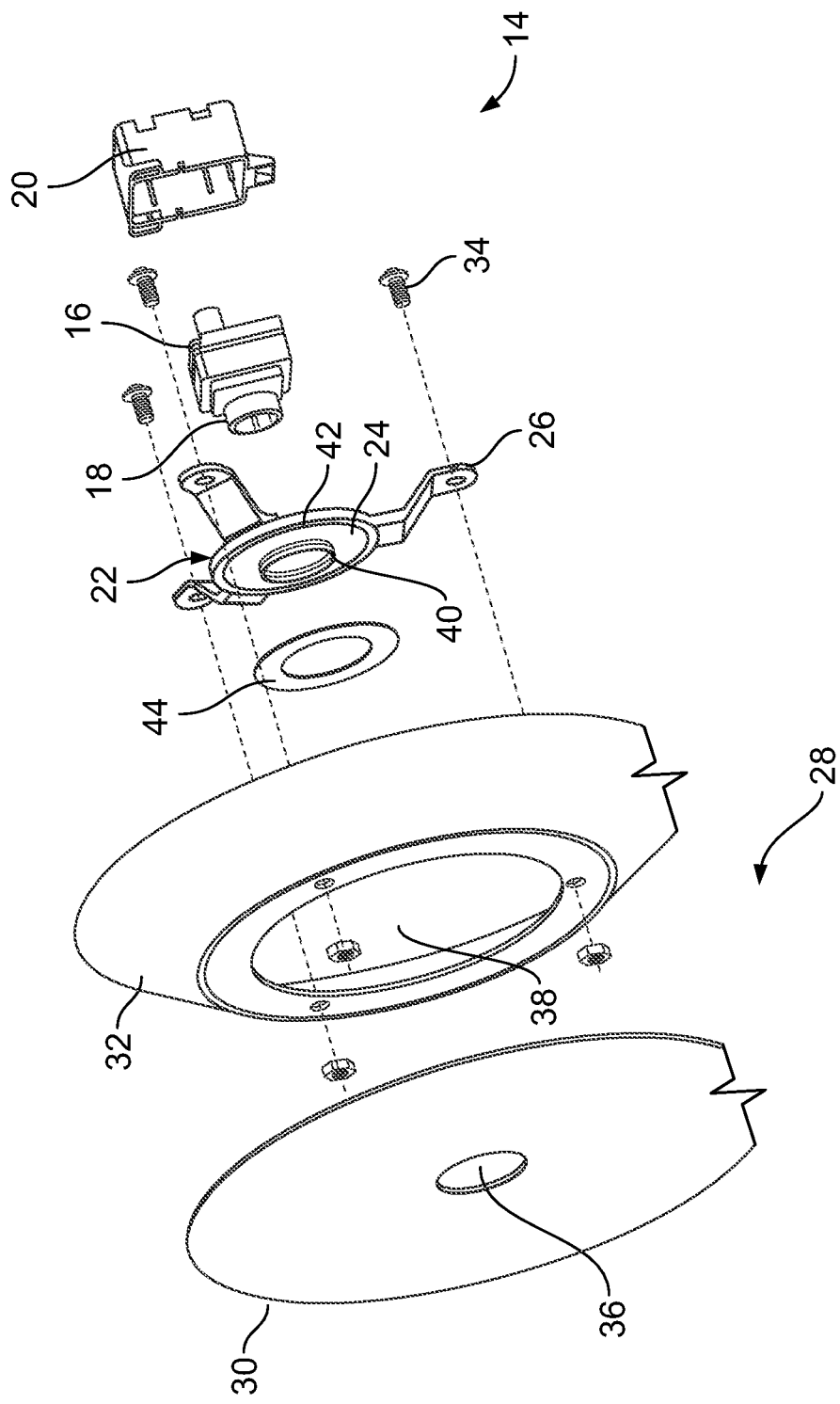
FIG. 2 is exploded view of an assembly according to an embodiment of the present disclosure.

Referring now to FIGS. 2 and 3, the sensor assembly 14 according to an embodiment of the present disclosure is illustrated in further detail.

The sensor assembly 14 includes a sensor 16 having a lens 18. The sensor 16 may include an optical camera, LiDAR, or other sensor types having one or more lenses. The lens 18 is configured to receive and transmit light or other signals as appropriate to sensing elements of the sensor 16, and may comprise glass or other generally transparent materials.

The sensor 16 is disposed at least partially within a housing 20. The housing 20 is provided to support and protect the sensor 16, and may be formed of a plastic material, metal material, or any other suitable material. The housing 20 is provided with a mounting feature 22 for mounting to a panel, as will be discussed in further detail below. In the embodiment illustrated in FIGS. 2 and 3, the mounting feature 22 is a bracket having an annular portion 24 and a plurality of arm members 26. In this embodiment, the mounting feature 22 is coupled to the housing 20, e.g. by fasteners or adhesive. The sensor 16 is retained between the housing 20 and mounting feature 22 with the lens 18 arranged generally concentrically with aperture of the annular portion 24.

The sensor 16, housing 20, and mounting feature 22 may be collectively referred to as a sensor module. It should be understood that other sensor modules contemplated within the scope of the present disclosure may have different arrangements of housings, sensors, and mounting features. As non-limiting examples, the mounting feature may be integrated into the housing, may have a different shape, may be disposed in a different location, or any combination thereof as appropriate for a given implementation.

The mounting feature 22 is coupled to a panel assembly 28 comprising a first panel 30 and a second panel 32. In the exemplary embodiment illustrated in FIG. 1, the first panel 30 is an exterior panel on the exterior of the vehicle and the second panel 32 is an interior panel. However, other embodiments may take other configurations. For example, in embodiments with sensor assemblies disposed inside a passenger compartment, the first panel 30 may be an interior panel in the passenger compartment.

The mounting feature 22 is coupled to the second panel 32. In the embodiment illustrated in FIG. 2, this comprises inserting fasteners 34 through fastener holes in the arm members 26 and thereafter into corresponding fastener holes in the second panel 32. However, in other embodiments, the mounting feature 22 may be coupled to the second panel 32 by other means, e.g. by other configurations of fasteners or by use of adhesives.

The first panel 30 is provided with a first aperture 36, and the second panel 32 is provided with a second aperture 38. In the exemplary embodiment illustrated in FIGS. 2 and 3, the first aperture 36, second aperture 38, annular portion 24 of the mounting feature 22, and lens 18 are all generally concentric with one another, i.e. have a generally common central axis. However, other embodiments contemplated within the scope of the present disclosure may have other configurations, e.g. with at least one of the above components not arranged concentrically with others of the above components.

The second aperture 38 has a diameter exceeding that of the annular portion 24 of the mounting feature 22 but less than an outer diameter of the arm members 26. The annular portion 24 is secured in a desired position relative to, e.g. generally concentric with, the second aperture 38 by means of coupling of the arm members 26 to the second panel 32.

In the exemplary embodiment of FIGS. 1-3, the mounting feature 22 is provided with a bezel 40 and a standoff 42, each projecting from a face of the annular portion 24 proximate the panel assembly 28. The bezel 40 extends from an inner periphery of the annular portion 24 and extends about the periphery of the lens 18. The standoff 42 projects from an outer periphery of the annular portion 24. A channel is thereby defined between the bezel 40 and the standoff 42. A sealing member 44 is provided in the channel. The sealing member 44 may comprise natural or synthetic rubber, or any other suitable material for inhibiting water or debris intrusion into the assembly. The standoff 42 abuts an inner surface of the first panel 30, and is preferably sized to securely retain the sealing member 44 between the annular portion 24 and the first panel 30. However, in other embodiments contemplated within the scope of the present disclosure, the standoff 42 may have a different size and/or different location, or may be omitted from the assembly.

The first aperture 36 has a diameter exceeding that of the bezel 40, but less than the diameter of the annular portion 24 of the mounting feature 22. In the exemplary embodiment illustrated in FIGS. 2 and 3, the first aperture 36 has a diameter generally corresponding to, e.g. only slightly exceeding, that of the bezel 40. Advantageously, such embodiments result in a visually unobtrusive assembly, as only the bezel 40 and lens 18 are visible from the exterior of the first panel 30.

While the above has been discussed largely in the context of an optical camera assembly for a rear-view camera, other configurations are contemplated within the scope of the present disclosure. As an example, other embodiments may include optical cameras positioned in other locations, LiDAR assemblies in various locations, sensors within an occupant cabin, or any combination thereof. Moreover, non-automotive implementations are contemplated within the scope of the present disclosure.

As may be seen, the present disclosure provides low-profile sensor assemblies which may result in more aesthetically-desirable styling relative to known configurations, and moreover may do so while satisfying sealing requirements.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
a plurality of panels defining a vehicle body, the plurality of panels including a first panel and a second panel, the first panel having an aperture therethrough;
a camera housing;
a camera having a lens, the camera being disposed at least partially within the camera housing; and
a mounting feature coupling the camera housing to the second panel with the camera lens disposed in register with the aperture, the mounting feature comprising a bracket coupled to the camera housing and to the second panel, the bracket having an annular portion, the camera housing being at least partially disposed in the annular portion, the annular portion having an inner periphery with a bezel projecting therefrom, the bezel extending at least partially through the aperture.

2. The automotive vehicle of claim 1, wherein the bracket has at least one arm member projecting from the annular portion, the at least one arm member being secured to the second panel.

3. The automotive vehicle of claim 1, wherein second panel is provided with a second aperture, and wherein the mounting feature is disposed at least partially within the second aperture.

4. The automotive vehicle of claim 1, further comprising a seal member disposed between the mounting feature and the first panel.

5. The automotive vehicle of claim 1, wherein the first panel defines an exterior panel at an aft portion of the vehicle.

6. An assembly comprising:
a first panel having a first panel first surface, a first panel second surface, and a first aperture extending therethrough;
a second panel disposed proximate the first panel, the second panel having a second panel first surface, a second panel second surface, and a second aperture extending therethrough, the second panel first surface being adjacent the first panel second surface;
a sensor module including a sensor housing and a sensor having a lens, the sensor being disposed at least partially within the sensor housing; and
a mounting feature coupling the sensor module to the second panel, the mounting feature comprising a bracket coupled to the sensor housing and to the first panel, the mounting feature including an annular portion, the sensor housing being at least partially disposed in the annular portion, the annular portion having an inner periphery with a bezel projecting therefrom, the bezel extending at least partially through the first aperture, wherein the sensor module is disposed at least partially in the second aperture with the lens generally in register with the first aperture.

7. The assembly of claim 6, wherein the bracket has at least one arm member projecting from the annular portion, the at least one arm member being secured to the second panel.

8. The assembly of claim 6, wherein the annular portion has an outer periphery with a flange member projecting from the outer periphery, the flange member abutting the first panel second surface.

9. The assembly of claim 8, further comprising a seal member disposed between the mounting feature and the first panel second surface, the seal member being retained by the flange member.

10. The assembly of claim 6, wherein the mounting feature is coupled to the second panel second surface.

11. The assembly of claim 6, wherein the sensor comprises an optical camera.

12. The assembly of claim 6, wherein the first panel defines an exterior panel of an automotive vehicle.

* * * * *